United States Patent Office 3,527,592
Patented Sept. 8, 1970

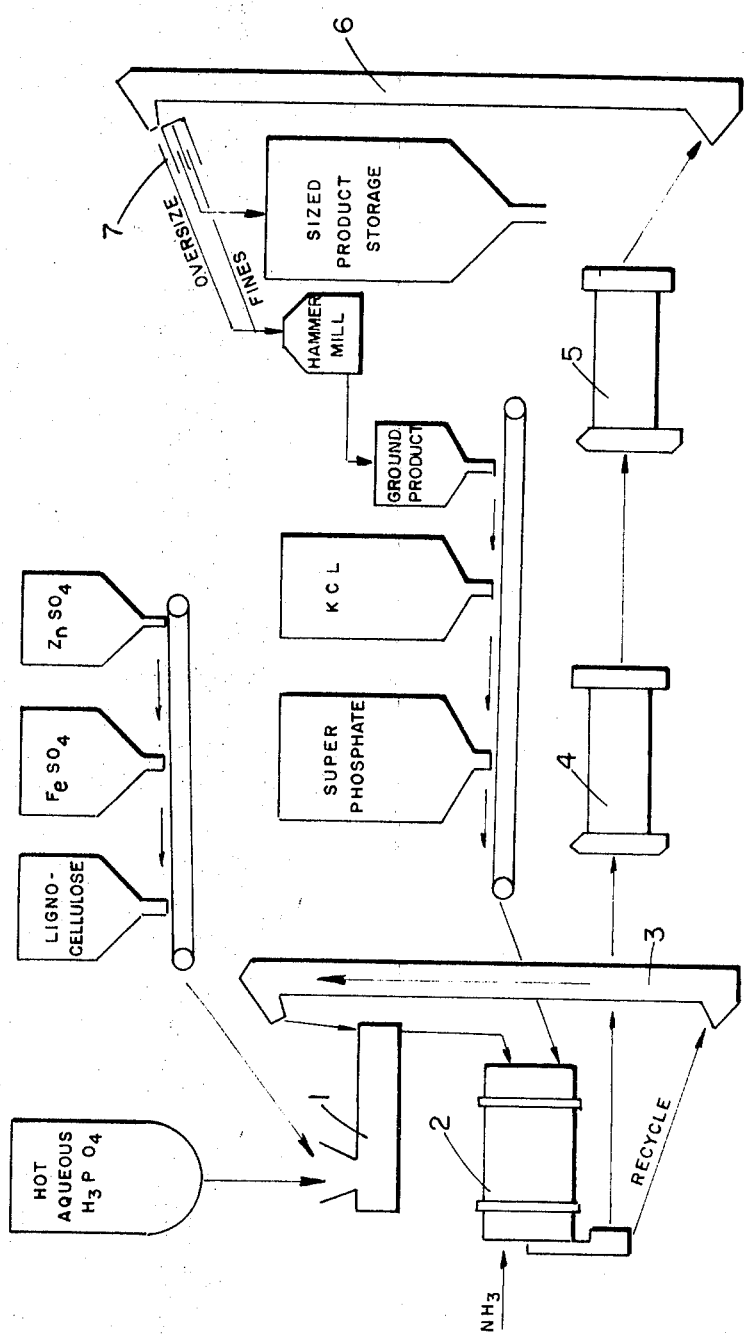

3,527,592
PROCESS FOR MANUFACTURING
GRANULAR FERTILIZER
Wilbur A. McPherson, Baxter Springs, Kans., and Robert W. Hamilton, Joplin, Mo., assignors to Gulf Oil Corporation, Pittsburgh, Pa., a corporation of Pennsylvania
Filed Jan. 29, 1968, Ser. No. 701,448
Int. Cl. C05f 11/02
U.S. Cl. 71—24          1 Claim

ABSTRACT OF THE DISCLOSURE

In the manufacture of a granular fertilizer containing organic material derived from acid digestion of lignocellulose, difficulties inherent in the handling of cohesive organic materials in fertilizer manufacturing equipment are overcome by a combination of the following:

Use of controlled narrow particle size range of lignocellulose, only partial digestion of the lignocellulose, maintenance of continuous flow and mixing during partial digestion, followed by mixing of the partially digested organic material with recycled granular fertilizer in order to maintain good flow conditions. The partially digested lignocellulose material is then incorporated with fertilizer solids in a conventional granulating drum to produce a substantially spherical granular product.

DESCRIPTION OF INVENTION

It is common knowledge that a substantial proportion of the phosphate values in fertilizers are apparently unavailable and are not utilized by plant life. The effect of the unavailablity of phosphate values becomes particularly apparent in the growth of certain crops which require large amounts of phosphate. It has been observed in the past that in soils which contain a great deal of decomposed organic matter the phosphate values of fertilizer appear to be much more available and plants which require large proportions of phosphate do much better. Apparently a reasonable explanation for this observed behavior is that in these soils organic polyelectrolyte materials are adsorbed by the clay in the soil and displace the phosphate, which would otherwise be tightly bound by the clay and rendered unavailable to plants.

In tropical and semitropical areas of the earth the action of bacteria in the soil is so rapid and the growth of plant life so luxuriant that organic matter in the soil is very quickly decomposed completely and the nutrients released are taken up immediately, so that the soil is usually rather depleted with respect to nutrients. Phosphate values in fertilizer are taken up and bound by these depleted soils, rather than made available to plants. In the cooler areas of the earth there is a great deal of organic matter in the soil which remains undecomposed because of the low temperature and very slow action of soil bacteria. In these regions phosphate values also become tightly bound by clay in the soil because the bacteria have failed to break down organic matter into lower molecular weight polyelectrolyte substances which are capable of displacing the tightly bound phosphate. A proposed solution to the problem of inadequate organic polyelectrolyte substances in the soil is to add to the soil organic polymers which are commonly called soil conditioners. This approach to the problem, however, is very uneconomical and unsatisfactory. Ordinarily the action of bacteria quickly depletes the quantity of synthetic soil conditioner which has been placed in the soil, requiring repeated applications of soil conditioning chemicals at prohibitive expense. Another solution to the problem which has been suggested is to incorporate in phosphate-containing fertilizer a quantity of organic polyelectrolyte substance sufficient to make the phosphate values and certain metals more readily available in the fertilizer. This would be much less expensive, since it would not involve an attempt to condition the entire volume of soil under tillage but merely would require enough organic substance to make sure that the phosphate values were not tightly bound by clay. The use of acid digested lignocellulose as a suitable polyelectrolyte to incorporate in fertilizers has been suggested. However, when acid digestion of lignocellulose is attempted it is found that the material becomes sticky and unmanageable in ordinary processing equipment. In a fertilizer plant it is essential that a large throughput rate be maintained, since the product must be made in very large tonnages. It is also very desirable to be able to use the conventional types of fertilizer manufacturing equipment, since it is usually impractical to build special plants for the manufacture of each particular type of fertilizer.

The commonest piece of fertilizer equipment and probably the most useful in fertilizer manufacture is the revolving granulator, a cylindrical drum-like apparatus which is revolved at fairly low speed, maintaining inside it a free flowing rolling bed of solid particles which are formed from liquid and solid feed streams into the granulator. The treatment of lignocellulose materials to render them suitable for incorporation in fertilizer unfortunately renders them unsuitable for use in a process employing a revolving granulator. When lignocellulose materials are digested with phosphoric acid, for example, they acquire adhesive properties. It is not feasible to maintain granulating conditions in a revolving granulator if the rolling bed contains adhesive materials. The result of such a situation is the balling up of the materials in the granulator into very large chunks and failure to produce a granular product. The use of digested lignocellulose in a conventional granular fertilizer manufacturing process then depends upon in some way alleviating the adhesive properties of the digested organic material.

We have discovered that by the use of a combination of techniques, the troubles encountered in use of organic material in a granulating process can be substantially eliminated. First of all we select lignocellulose particles of a rather narrow particle size range, preferably from about 10 to 14 mesh size. The presence of fines in the particles of lignocellulose material is particularly objectionable, since these fines are rapidly converted by the digestion process into material which bears a resemblance to glue. The presence of a few oversize particles has no particularly deleterious effect. Digestion with hot aqueous phosphoric acid is the preferred method of converting lignocellulose to a product having the desired properties. The conversion must be carried out in such a way as to prevent the formation of a cohesive mass of digestion product. In our process this is accomplished by digesting lignocellulose materials such as sawdust or ground corncobs in an apparatus in which the hot phosphoric acid and lignocellulose are continuously mixed in a wet mealy condition and digestion is carried out only to the point at which cohesive behavior becomes apparent. At this point the partially digested material is immediately mixed with recycled moist solid granular product from the rotating granulator so that a free-flowing mixture is obtained. This free-flowing, moist, hot mixture is then fed into the rotating granulator along with various fertilizer solids such as superphosphate and potassium chloride. Mixtures of this nature can be kept moving in the granulator in the form of a free flowing rolling bed so that granulation can be accomplished in the conventional manner. It is preferred to ammoniate the acidic mixture in the granulator so as to obtain neutral or nearly neutral products. The process may be summarized briefly as follows:

In our process the following steps are performed in sequence:

(a) Mixing at a temperature between about 80° and 110° C. aqueous phosphoric acid, lignocellulosic material having a controlled particle size ranging from about 10 to 14 mesh (U.S. Series and a water-soluble inorganic iron salt for a sufficient length of time so that the particles in the mixture exhibit cohesive tendencies, (b) Incorporating in the mixture of step (a) sufficient moist granular fertilizer product from a revolving granulator to obtain a free-flowing mixture and feeding said free-flowing mixture to said granulator along with particulate fertilizer solids, to form a rolling bed of moist solid particles, (c) Reacting ammonia with the rolling bed of moist solid particles in the revolving granulator to yield moist granular product, (d) Recycling sufficient moist granular product to step (b) to obtain a free-flowing mixture and drying and cooling the remainder of said granular product, (e) Removing fines and oversize particles from the dry cool granular product of step (d) to yield granular product of controlled particle size.

The nature of the process is discussed in detail below.

Step (a)

The process conditions which are maintained in this step are critical to the successful continuous operation of the process. The partial digestion of lignocellulose is carried out in this step while continuously mixing a mass of reactants kept in a condition of a wet meal. It is essential that the mixture not be permitted to take on the characteristics of a cohesive mass. In typical operation of the process in the plant, hot phosphoric acid at a temperature in the vicinity of 100° C. and particulate lignocellulose materials such as sawdust or ground corncobs is fed into a mixing apparatus such as the blunger (No. 1 in the drawing). In an apparatus such as a blunger the wet mixture is continuously mixed by counter-rotating helical mixing blades and moved horizontally from one end of the apparatus to the other. The residence time of the mixture of hot phosphoric acid and lignocellulose can be regulated so that it is a matter of 5 to 10 minutes. The aqueous phosphoric acid may be the conventional wet process acid, which is about 54 percent $P_2O_5$ and contains a substantial amount of sulfuric acid. The amount of acid employed is only enough to wet the lignocellulose thoroughly, without being enough to cause the mixture to tend to form a slurry. The control of particle size of the lignocellulose to a narrow range within about 10 to 14 mesh makes it possible to carry out a partial digestion on the surface of the particles without the particles losing their integrity. Fine particles, if present, however will become completely digested, lose their integrity and begin to cause the mixture to stick together in a cohesive mass. If this should occur the lignocellulose is not in proper condition to be fed into the granulator along with particulate solids and the process will not operate continuously. Since fertilizer manufactured according to the present process will have a high level of phosphate availability and the plant life will therefore be nourished at a very high level, certain other nutrients must be supplied in order to prevent deficiency conditions from developing. Among the other necessary nutrients are iron in particular and other metals, as for example zinc or magnesium. It is very desirable to incorporate in the reaction mixture in this step a water-soluble inorganic iron salt. During the reaction in this step the iron becomes combined with the lignocellulose digestion product in such a way that it becomes immediately available to plant life and is not likely to become permanently bound by clay in the soil and lost to the plants. As indicated on the drawing, other metal salts such as zinc sulfate may also be incorporated in the reaction mixture. The preferred iron salt is ferrous sulfate which may conveniently be used in the form of a crystalline hydrate. The reaction may be successfully carried out in the blunger at a temperature of about 100° C. using wet process phosphoric acid without prohibitive corrosion or other problems. Suitable proportions of the reactants employed in this step appear in the specific examples which follow this discussion. By the time the reaction mixture reaches the exit of the blunger it should have begun to exhibit some cohesive tendencies but not be in such a condition that it has begun to form a cohesive mass.

Step (b)

In order to prevent balling up of large masses in the granulator and poor flow behavior through the tube or other passage from the blunger to the granulator it is essential that moist recycled product from the granulator be blended into the reaction mixture in the blunger in the vicinity of the blunger exit. The use of sufficient recycled moist product from the granulator will make it possible to obtain a free-flowing mixture of the moist material from the blunger. By recycling directly from the granulator without drying or cooling, heat is conserved, which serves as an aid in evaporating moisture during granulation. In this step, other fertilizer solids are also fed into the granulator and incorporated in the fertilizer composition. As shown in the drawing, superphosphate and potassium chloride are typical fertilizer solids employed for this purpose. The revolving granulator (No. 2 in the drawing) is the principal piece of apparatus used in the process. It is here in this apparatus that moist solids are rolled into balls or substantially spherical granules.

Step (c)

It is also in the granulator (No. 2 in the drawing) that ammonia is reacted with acid present in the moist granules which are in the process of being formed. The reaction with ammonia yields a product which is more nearly neutral, contains a substantial amount of available nitrogen and which is dried to some extent and solidified through the evaporation of water by the effect of the heat of reaction.

Step (d)

The diversion of a substantial portion of the moist product from the granulator to serve as a recycle stream to the exit zone of the blunger is an essential step in the process. A rather high recycle rate may be employed beneficially. For example, it is not uncommon to divert at least half of the product stream into the recycle elevator (No. 3 on the drawing), sending this material to the exit zone of the blunger. The high rate of recycle makes possible a rapid movement through the granulator which has a beneficial effect with respect to roundness of particles and also appears to help prevent the formation of scale or deposit on the walls of the granulator. The use of a high recycle rate does not substantially hinder the maintenance of a high production rate because of this beneficial effect of rapid flow of solids through the granulator and the fact that the recycle is circulated without cooling so that heat is conserved, which hastens the evaporation of water, so that granulation is accelerated. The remainder of the granulated product which is not recycled is diverted to the dryer (No. 4) and then to the cooler (No. 5 in the drawing).

Step (e)

The dried, cooled granular product is normally conveyed to an elevator (represented in the drawing as No. 6) and from there into a sizing screen (No. 7 in the drawing) where both oversize and fine particles are removed. The product obtained in this manner has a closely controlled particle size which makes it more attractive and improves its handling characteristics. Oversize and fines may be milled or ground and used as fertilizer solids in the granulation process or they may be diverted for other use. The following specific examples illustrate the manufacture of various fertilizers by the process of this invention. The proportions of feed to the blunger and to the granulator are given in the number of pounds per ton of raw ingredients, the process being operated on a continuous basis for some period of time in each example.

*Example 1.*—In this example a fertilizer having a N—$P_2O_5$—$K_2O$ equivalent analysis of 6–18–12 was made containing in addition one percent iron and six percent sulfur. The ingredients were fed to the process at the rates given below.

To the blunger was fed 666 pounds of wet process phosphoric acid (54% $P_2O_5$) with 649 pounds of ground corncobs of a particle size between about 10 and 14 mesh and 100 pounds of crystalline ferrous sulfate nonahydrate.

To the granulator was fed in addition to the mixture from the blunger the following solids: 400 pounds of fertilizer grade crystalline potassium chloride and 103 pounds of elemental sulfur. The recycle stream was approximately half of the total product obtained from the granulator. The temperature maintained in the blunger was approximately 100° C. The temperature at the throat of the gas fired dryer (No. 4 in the drawing) was approximately 150° C. and the quantity of water removed in the process was approximately twenty pounds per ton of product. The amount of ammonia consumed in ammoniation in the granulator was approximately 148 pounds per ton of feed. The product was screened to remove oversize and fines, yielding a product consisting of substantially spherical granules of good appearance and good handling characteristics.

*Example 2.*—In this example a fertilizer was manufactured which had a nutrient equivalent analysis of 6–24–12, containing in addition one percent iron.

The feed to the blunger consisted of 500 pounds of wet process phosphoric acid, 556.5 pounds of ground corncobs screened to a size ranging from about 10 to 14 mesh and 100 pounds of ferrous sulfate nonahydrate.

The dry feed to the granulator in addition to recycle mixed with the blunger product consisted of 458 pounds of a solid fertilizer with an analysis of 18–46–0 and 400 pounds of potassium chloride. The ammonia flow to the granulator was regulated so that 45.5 pounds of ammonia was consumed for each ton of feed. Operating conditions were maintained essentially the same as those in Example 1, giving a product of similar appearance and physical characteristics.

*Example 3.*—In this example the fertilizer was made with the nutrient equivalent analysis of 5–10–30, containing in addition two percent iron. The feed to the blunger consisted of 370 pounds of wet process phosphoric acid, 200 pounds of ferrous sulfate nonahydrate and 310 pounds of ground corncobs ranging in particle size between about 10 and 14 mesh. The additional fertilizer ingredients which were fed to the granulator consisted of 1000 pounds of coarse crystalline potassium chloride and 87 pounds of urea. The ammonia flow to the granulator was regulated so that about 73 pounds of ammonia was consumed for each ton of feed.

The operating conditions were essentially similar to those employed in Example 1. The product after removal of fines and oversize consisted of substantially spherical granules of attractive appearance and good handling and storage characteristics.

This fertilizer was employed in side dressing of peanuts in comparison with a similar mixed fertilizer with a 5–10–30 analysis but which contained no organic material or iron. The fertilizer of this example showed a twenty percent improvement in yield of peanuts over the ordinary fertilizer.

Other lignocellulose materials may be employed in the process using essentially similar process conditions to those illustrated in the above examples. Hardwood sawdust in particular, where available, is useful for this purpose. In the use of other lignocellulose products the same precautions must be observed; that is, there must be no fines present and the particle size range should be carefully controlled so as to obtain a uniform degree of digestion in the blunger.

The fertilizer products obtained by the process of this invention are unusual in their ability to provide immediately available phosphate values during the growing season in which the fertilizer is applied. The effect of the organic material present in the fertilizer is obtained during the first growing season, both with respect to rendering phosphate values available and providing essential metal ions in soluble form. The preferred use of these products is in the growth of seed crops such as corn, wheat, grain sorghum, rice, beans and peanuts in which high levels of potassium, iron and phosphate availability are particularly desirable.

We claim:

1. A process for manufacturing a granular fertilizer having highly available phosphate values comprising the following steps, performed in sequence:
   (a) mixing at a temperature between about 80° and 110° C. aqueous phosphoric acid, lignocellulosic material having a controlled particle size ranging from about 10 to 14 mesh (U.S. Series) and a water-soluble inorganic iron salt for a sufficient length of time so that the solid particles in the mixture begin to exhibit cohesive tendencies,
   (b) incorporating in the mixture of step (a) sufficient moist granular fertilizer product from a revolving granulator to obtain a free-flowing mixture and feeding said free-flowing mixture to said granulator along with particulate fertilizer solids, to form a rolling bed of moist solid particles,
   (c) reacting ammonia with the rolling bed of moist solid particles in the revolving granulator to yield moist granular product,
   (d) recycling sufficient moist granular product to step (b) to obtain a free-flowing mixture and drying and cooling the remainder of said granular product,
   (e) removing fines and oversize particles from the dry cool granular product of step (d) to yield granular product of controlled particle size.

References Cited
UNITED STATES PATENTS

| | | | |
|---|---|---|---|
| 2,574,027 | 11/1951 | Farber | 71—24 |
| 2,735,756 | 2/1956 | Farber | 71—23 |
| 2,901,339 | 8/1959 | Boomer et al. | 71—23 |
| 3,005,697 | 10/1961 | McKnight et al. | 71—64 |

REUBEN FRIEDMAN, Primary Examiner

C. N. HART, Assistant Examiner

U.S. Cl. X.R.

71—34, 43, 64